(12) United States Patent
Nazarpoor et al.

(10) Patent No.: US 9,731,279 B2
(45) Date of Patent: *Aug. 15, 2017

(54) THERMAL STABILITY OF COPPER-MANGANESE SPINEL AS ZERO PGM CATALYST FOR TWC APPLICATION

(71) Applicant: Clean Diesel Technologies, Inc., Oxnard, CA (US)

(72) Inventors: Zahra Nazarpoor, Camarillo, CA (US); Anke Elizabeth Abken, Port Hueneme, CA (US); Stephen J. Golden, Santa Barbara, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/528,746

(22) Filed: Oct. 30, 2014

(65) Prior Publication Data

US 2016/0121308 A1 May 5, 2016

(51) Int. Cl.
*B01J 23/889* (2006.01)
*B01J 37/02* (2006.01)
(Continued)

(52) U.S. Cl.
CPC ........ *B01J 23/8892* (2013.01); *B01D 53/945* (2013.01); *B01J 23/005* (2013.01);
(Continued)

(58) Field of Classification Search
CPC .. B01J 23/8892; B01J 23/005; B01J 37/0242; B01J 37/0244; B01J 2523/00;
(Continued)

(56) References Cited

U.S. PATENT DOCUMENTS

| 3,907,716 A | 9/1975 | Haacke |
| 4,629,472 A | 12/1986 | Haney, III et al. |

(Continued)

FOREIGN PATENT DOCUMENTS

| WO | WO 90/07561 | 7/1990 |
| WO | WO 94/11467 | 5/1994 |

(Continued)

OTHER PUBLICATIONS

Salker et al., "Electronic and catalyic studies on Co1-xCuxMn2O4 for CO oxidation," Journal of Materials Science 35 (2000) 4713-4719.*

(Continued)

*Primary Examiner* — Anthony J Zimmer
(74) *Attorney, Agent, or Firm* — Alston & Bird LLP

(57) ABSTRACT

Effect of the type of ZPGM material composition to improve thermal stability of ZPGM catalyst systems for TWC application is disclosed. ZPGM catalyst system samples are prepared and configured with washcoat on ceramic substrate, overcoat including doped Zirconia support oxide, and impregnation layer including either $Cu_1Mn_2O_4$ spinel or $Cu_1Co_1Mn_1O_4$ spinel. Testing of ZPGM catalyst samples including variations of aging temperatures and different impregnation layer materials are developed under isothermal steady state sweep test condition for ZPGM catalyst systems to evaluate performance especially $NO_x$ conversions and level of thermal stability. As a result disclosed ZPGM catalyst systems with most suitable spinel that includes $Cu_1Co_1Mn_1O_4$ in impregnation layer exhibit high NOx conversion and significant improved thermal stability compare to $Cu_1Mn_2O_4$ spinel, which is suitable for under floor and close coupled TWC application. The effect of adding Co to Cu—Mn spinel composition to improve thermal stability confirmed by TPR measurement.

13 Claims, 8 Drawing Sheets

(51) Int. Cl.
*B01J 23/00* (2006.01)
*B01D 53/94* (2006.01)

(52) U.S. Cl.
CPC ....... *B01J 37/0242* (2013.01); *B01J 37/0244* (2013.01); *B01D 2255/2073* (2013.01); *B01D 2255/2092* (2013.01); *B01D 2255/20715* (2013.01); *B01D 2255/20746* (2013.01); *B01D 2255/20761* (2013.01); *B01D 2255/405* (2013.01); *B01D 2255/65* (2013.01); *B01J 2523/00* (2013.01); *Y02T 10/22* (2013.01)

(58) Field of Classification Search
CPC .............. B01D 53/945; B01D 2255/65; B01D 2255/20746; B01D 2255/2092; B01D 2255/20761; B01D 2255/2073; B01D 2255/20715; B01D 2255/405; Y02T 10/22
See application file for complete search history.

(56) References Cited

U.S. PATENT DOCUMENTS

| | | |
|---|---|---|
| 4,891,050 A | 1/1990 | Bowers et al. |
| 4,892,562 A | 1/1990 | Bowers et al. |
| 5,034,020 A | 7/1991 | Epperly et al. |
| 5,108,979 A | 4/1992 | Magnabosco et al. |
| 5,168,836 A | 12/1992 | Kraus |
| 5,203,166 A | 4/1993 | Miller |
| 5,266,083 A | 11/1993 | Peter-Hoblyn et al. |
| 5,404,841 A | 4/1995 | Valentine |
| 5,501,714 A | 3/1996 | Valentine et al. |
| 5,535,708 A | 7/1996 | Valentine |
| 5,584,894 A | 12/1996 | Peter-Hoblyn et al. |
| 5,693,106 A | 12/1997 | Peter-Hoblyn et al. |
| 5,732,548 A | 3/1998 | Peter-Hoblyn et al. |
| 5,743,922 A | 4/1998 | Peter-Hoblyn et al. |
| 5,749,928 A | 5/1998 | Epperly et al. |
| 5,809,774 A | 9/1998 | Peter-Hoblyn et al. |
| 5,809,775 A | 9/1998 | Tarabulski et al. |
| 5,819,529 A | 10/1998 | Peter-Hoblyn et al. |
| 5,868,421 A | 2/1999 | Eyrainer |
| 5,921,080 A | 7/1999 | Ulmet et al. |
| 5,924,280 A | 7/1999 | Tarabulski |
| 5,939,354 A | 8/1999 | Golden |
| 5,968,464 A | 10/1999 | Peter-Hoblyn et al. |
| 5,976,475 A | 11/1999 | Peter-Hoblyn et al. |
| 5,977,017 A | 11/1999 | Golden |
| 6,003,303 A | 12/1999 | Peter-Hoblyn et al. |
| 6,023,928 A | 2/2000 | Peter-Hoblyn et al. |
| 6,051,040 A | 4/2000 | Peter-Hoblyn et al. |
| 6,063,350 A | 5/2000 | Tarabulski et al. |
| 6,124,130 A | 9/2000 | Olson |
| 6,203,770 B1 | 3/2001 | Peter-Hoblyn et al. |
| 6,279,603 B1 | 8/2001 | Czarnik et al. |
| 6,352,955 B1 | 3/2002 | Golden |
| 6,361,754 B1 | 3/2002 | Peter-Hoblyn et al. |
| 6,372,686 B1 | 4/2002 | Golden |
| 6,531,425 B2 | 3/2003 | Golden |
| 6,948,926 B2 | 9/2005 | Valentine et al. |
| 7,014,825 B2 | 3/2006 | Golden |
| 7,473,288 B2 | 1/2009 | Toyoda et al. |
| 7,527,776 B2 | 5/2009 | Golden et al. |
| 7,641,875 B1 | 1/2010 | Golden |
| 8,318,629 B2 | 11/2012 | Alive et al. |
| 8,323,601 B2 | 12/2012 | Justic et al. |
| 8,802,582 B2 | 8/2014 | Malyala et al. |
| 8,845,987 B1 | 9/2014 | Nazarpoor et al. |
| 8,853,121 B1 | 10/2014 | Nazarpoor et al. |
| 9,216,410 B2 | 12/2015 | Hatfield |
| 2001/0001354 A1 | 5/2001 | Peter-Hoblyn et al. |
| 2002/0001554 A1 | 1/2002 | Czarnik et al. |
| 2002/0042341 A1 | 4/2002 | Golden |
| 2003/0109047 A1 | 6/2003 | Valentine |
| 2003/0126789 A1 | 7/2003 | Valentine et al. |
| 2003/0148235 A1 | 8/2003 | Valentine et al. |
| 2003/0185722 A1 | 10/2003 | Toyoda |
| 2003/0198582 A1 | 10/2003 | Golden |
| 2004/0098905 A1 | 5/2004 | Valentine et al. |
| 2004/0172876 A1 | 9/2004 | Sprague et al. |
| 2005/0132674 A1 | 6/2005 | Toyoda et al. |
| 2005/0160663 A1 | 7/2005 | Valentine |
| 2005/0160724 A1 | 7/2005 | Valentine et al. |
| 2005/0164139 A1 | 7/2005 | Valentine et al. |
| 2005/0188605 A1 | 9/2005 | Valentine et al. |
| 2005/0217751 A1 | 10/2005 | Valentine et al. |
| 2006/0081922 A1 | 4/2006 | Golden |
| 2006/0120936 A1 | 6/2006 | Alive et al. |
| 2006/0166816 A1 | 7/2006 | Zhang et al. |
| 2006/0228283 A1 | 10/2006 | Malyala et al. |
| 2006/0254535 A1 | 11/2006 | Valentine et al. |
| 2006/0260185 A1 | 11/2006 | Valentine et al. |
| 2007/0015656 A1 | 1/2007 | Valentine et al. |
| 2007/0209272 A1 | 9/2007 | Valentine |
| 2007/0283681 A1 | 12/2007 | Makkee et al. |
| 2008/0210184 A1 | 9/2008 | Valentine et al. |
| 2008/0226524 A1 | 9/2008 | Alive et al. |
| 2008/0265212 A1 | 10/2008 | Song et al. |
| 2009/0004083 A1 | 1/2009 | Valentine et al. |
| 2009/0304566 A1 | 12/2009 | Golden et al. |
| 2009/0324468 A1 | 12/2009 | Golden et al. |
| 2009/0324469 A1* | 12/2009 | Golden ................ B01D 53/945 423/212 |
| 2010/0240525 A1 | 9/2010 | Golden et al. |
| 2010/0316545 A1 | 12/2010 | Alive et al. |
| 2010/0316547 A1 | 12/2010 | Justic et al. |
| 2011/0239626 A1 | 10/2011 | Makkee et al. |
| 2012/0183447 A1 | 7/2012 | Kwan et al. |
| 2013/0115144 A1 | 5/2013 | Golden et al. |
| 2013/0236380 A1 | 9/2013 | Golden et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0271425 A1 | 9/2014 | Nazarpoor |
| 2014/0274662 A1 | 9/2014 | Nazarpoor |
| 2014/0274663 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0298714 A1 | 10/2014 | Sprague |
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0301931 A1 | 10/2014 | Nazarpoor |
| 2014/0302983 A1 | 10/2014 | Nazarpoor |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor |
| 2015/0005159 A1 | 1/2015 | Nazarpoor et al. |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |

(56) References Cited

U.S. PATENT DOCUMENTS

| | | |
|---|---|---|
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor et al. |
| 2015/0182954 A1 | 7/2015 | Nazarpoor et al. |
| 2015/0196902 A1 | 7/2015 | Golden et al. |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor et al. |
| 2015/0316524 A1 | 11/2015 | Hatfield |
| 2015/0352494 A1 | 12/2015 | Hatfield et al. |
| 2015/0352529 A1 | 12/2015 | Nazarpoor et al. |
| 2015/0352531 A1 | 12/2015 | Hatfield et al. |
| 2015/0352532 A1 | 12/2015 | Hatfield et al. |
| 2015/0352533 A1 | 12/2015 | Hatfield et al. |
| 2016/0023188 A1 | 1/2016 | Nazarpoor et al. |
| 2016/0030885 A1 | 2/2016 | Hatfield |
| 2016/0047751 A1 | 2/2016 | Pless et al. |
| 2016/0082422 A1 | 3/2016 | Nazarpoor et al. |
| 2016/0121304 A1 | 5/2016 | Nazarpoor et al. |
| 2016/0121308 A1 | 5/2016 | Nazarpoor et al. |
| 2016/0121309 A1 | 5/2016 | Nazarpoor et al. |
| 2016/0136617 A1 | 5/2016 | Nazarpoor et al. |
| 2016/0136618 A1 | 5/2016 | Nazarpoor et al. |
| 2016/0136619 A1 | 5/2016 | Nazarpoor et al. |
| 2016/0136620 A1 | 5/2016 | Nazarpoor et al. |
| 2016/0136621 A1 | 5/2016 | Nazarpoor et al. |
| 2016/0167023 A1 | 6/2016 | Nazarpoor et al. |
| 2016/0167024 A1 | 6/2016 | Nazarpoor et al. |
| 2016/0263526 A1 | 9/2016 | Golden |
| 2016/0263561 A1 | 9/2016 | Nazarpoor et al. |
| 2016/0312730 A1 | 10/2016 | Launois et al. |
| 2016/0346765 A1 | 12/2016 | Nazarpoor et al. |
| 2016/0354765 A1 | 12/2016 | Hatfield et al. |
| 2016/0361710 A1 | 12/2016 | Nazarpoor et al. |
| 2016/0361711 A1 | 12/2016 | Nazarpoor et al. |

FOREIGN PATENT DOCUMENTS

| | | |
|---|---|---|
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/85876 A1 | 11/2001 |
| WO | WO 03/068363 A1 | 8/2003 |
| WO | WO 2004/058641 A1 | 7/2004 |
| WO | WO 2009/139860 A1 | 11/2009 |
| WO | WO 2011/068509 A1 | 6/2011 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |
| WO | WO 2016/203371 | 12/2016 |

OTHER PUBLICATIONS

Wright et al., "Mixed-Metal Amorphous and Spinel Phase Oxidation Catalyts: Characterization by X-ray Diffraction, X-ray Absorption, Electron Microscopy, and Catalyic Studies of Systems Containing Copper, Cobalt, and Manganese," Chem. Mater. 1992, 4, 1053-1065.*

International Search Report and Written Opinion for corresponding International Application No. PCT/US2015/057942, dated Jan. 14, 2016.

* cited by examiner

THERMAL STABILITY OF COPPER-MANGANESE SPINEL AS ZERO PGM CATALYST FOR TWC APPLICATION

BACKGROUND

Field of the Disclosure

The present disclosure relates generally to catalyst materials, and more particularly to the effect of material compositions and aging temperatures on three-way catalyst (TWC) performance and thermal stability of Zero-PGM (ZPGM) catalyst systems.

Background Information

Current TWC systems significantly increase the efficiency of conversion of pollutants and, thus, aid in meeting emission standards for automobiles and other vehicles. In order to achieve an efficient three-way conversion of the toxic components in the exhaust gas, conventional TWC includes large quantities of PGM material, such as platinum, palladium, and rhodium, among others, dispersed on suitable oxide carriers. Because catalysts including PGM materials provide a very high activity for the conversion of $NO_x$, they are typically considered to be essential component of TWC systems.

Recent environmental concerns for a catalyst's high performance have increased the focus on the operation of a TWC at the end of its lifetime. Catalytic materials used in TWC applications have also changed, and the new materials have to be thermally stable under the fluctuating exhaust gas conditions. The attainment of the requirements regarding the techniques to monitor the degree of the catalyst's deterioration/deactivation demands highly active and thermally stable catalysts. As NO emission standards tighten and PGMs become scarce with small market circulation volume, constant fluctuations in price, and constant risk to stable supply, among others, there is an increasing need for new TWC catalyst compositions which may not require PGM and may be able to maintain efficient TWC of exhaust byproducts. There also remains a need for methods of producing such TWC catalyst formulations using the appropriate non-PGM materials.

According to the foregoing, there may be a need to provide catalytic properties which may significantly depend on the type of material, and aging temperatures for PGM-free catalyst systems which may be manufactured cost-effectively, such that TWC performance of ZPGM catalyst systems may be improved by providing suitable PGM-free catalytic layers.

SUMMARY

For catalysts, in a highly dispersed and active form aiming at improving catalyst activity after high temperature aging, a more effective utilization of the PGM-free catalyst materials may be achieved when expressed with an optimum selection of impregnation layer materials.

According to embodiments in present disclosure, disclosed ZPGM catalyst systems may include at least a substrate, a washcoat layer, an overcoat layer and an impregnation layer. A plurality of ZPGM catalyst systems may be configured to include an alumina-based washcoat layer coated on a suitable ceramic substrate, an overcoat layer of support oxide material, such as doped $ZrO_2$, and an impregnation layer including $Cu_1Mn_2O_4$ spinel or $Cu_1Co_1Mn_1O_4$ spinel.

In the present disclosure, a ZPGM catalyst system referred to as ZPGM catalyst system Type 1, may include an impregnation layer with a $Cu_1Mn_2O_4$ spinel; and a second ZPGM catalyst system, referred to as ZPGM catalyst system Type 2, may include an impregnation layer with a $Cu_1Co_1Mn_1O_4$ spinel.

According to embodiments in present disclosure, ZPGM catalyst systems may be aged at a plurality of temperatures, such as at about 850° C. and at about 900° C. under fuel gas composition.

Subsequently, aged ZPGM catalyst system samples may undergo testing to measure/analyze effect of impregnation layer material, and aging temperature, on TWC performance as well as thermal stability of disclosed ZPGM catalyst systems and find out most suitable impregnation layer material showing higher thermal stability.

The stability of activity of prepared aged ZPGM catalyst system samples, per variations of spinel material within impregnation layer may be determined and compared by performing isothermal steady state sweep test after different aging condition, which may be carried out at a selected inlet temperature using an 11-point R-value from rich condition to lean condition. The NO conversion results from isothermal steady state test may be compared to show the effect of aging temperature on TWC performance of spinel material.

Additionally, temperature programmed reduction (TPR) and X-ray Diffraction Analysis (XRD) may be performed using $Cu_1Mn_2O_4$ and $Cu_1Co_1Mn_1O_4$ bulk powder as an evidence of thermal stability of spinel phase at different temperatures.

Results from Isothermal Steady State Sweep Test, TPR, and XRD Analyses show that $Cu_1Co_1Mn_1O_4$ spinel, within ZPGM catalyst system Type 2, exhibit higher NO conversion and higher thermal stability compared to $Cu_1Mn_2O_4$ spinel, within ZPGM catalyst system Type 1.

Numerous other aspects, features, and benefits of the present disclosure may be made apparent from the following detailed description taken together with the drawing figures, which may illustrate the embodiments of the present disclosure, incorporated herein for reference.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
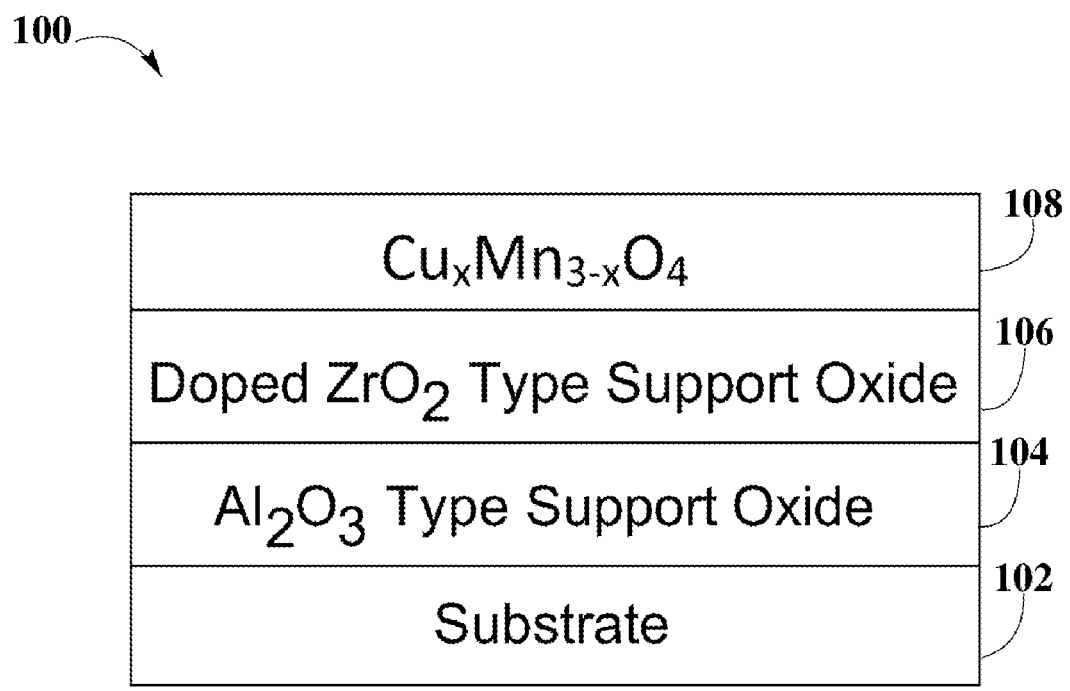
FIG. 1 illustrates configuration for ZPGM catalyst system Type 1, which includes an alumina-based washcoat on substrate, an overcoat with doped $ZrO_2$, and an impregnation layer including $Cu_1Mn_2O_4$ spinel, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

As used here, the following terms may have the following definitions:

"Platinum group Metal (PGM)" refers to platinum, palladium, ruthenium, iridium, osmium, and rhodium.

"Zero platinum group (ZPGM) catalyst" refers to a catalyst completely or substantially free of platinum group metals.

"Catalyst" refers to one or more materials that may be of use in the conversion of one or more other materials.

"Substrate" refers to any material of any shape or configuration that yields a sufficient surface area for depositing a washcoat and/or overcoat.

"Washcoat" refers to at least one coating including at least one oxide solid that may be deposited on a substrate.

"Overcoat" refers to at least one coating that may be deposited on at least one washcoat or impregnation layer.

"Milling" refers to the operation of breaking a solid material into a desired grain or particle size.

"Impregnation" refers to the process of imbuing or saturating a solid layer with a liquid compound or the diffusion of some element through a medium or substance.

"Calcination" refers to a thermal treatment process applied to solid materials, in presence of air, to bring about a thermal decomposition, phase transition, or removal of a volatile fraction at temperatures below the melting point of the solid materials.

"Spinel" refers to any of various mineral oxides of magnesium, iron, zinc, or manganese in combination with aluminum, chromium, copper or iron with $AB_2O_4$ structure.

"R-value" refers to the number obtained by dividing the reducing potential by the oxidizing potential of materials in a catalyst.

"Rich condition" refers to exhaust gas condition with an R-value above 1.

"Air/Fuel ratio" or A/F ratio" refers to the weight of air divided by the weight of fuel.

"Three-way catalyst (TWC)" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

"X-ray diffraction (XRD) analysis" refers to a rapid analytical technique that investigates crystalline material structure, including atomic arrangement, crystalline size, and imperfections in order to identify unknown crystalline materials (e.g. minerals, inorganic compounds).

"Temperature-programmed reduction (TPR)" refers to a technique for the characterization of solid materials and is often used in the field of heterogeneous catalysis to find the most efficient reduction conditions, an oxidized catalyst precursor is submitted to a programmed temperature rise while a reducing gas mixture is flowed over it.

DESCRIPTION OF THE DRAWINGS

The present disclosure may provide ZPGM catalyst systems with a plurality of material compositions including $Cu_xMn_{3-x}O_4$ spinel and $Cu_xCo_yMn_{3-x-y}O_4$ spinel within impregnation layers in order to develop suitable catalytic layers capable of providing high reactivity and thermal stability for ZPGM catalyst systems. The diversified aspects that may be treated in present disclosure may include different aging temperatures that may show improvements in the process for overall catalytic conversion capacity which may be suitable for TWC applications for under floor or close couple catalyst positions.

According to embodiments, disclosed ZPGM catalyst systems may include at least a substrate, a washcoat layer, an overcoat layer, and an impregnation layer. A plurality of ZPGM catalyst systems may be configured to include an alumina-based washcoat layer coated on a suitable ceramic substrate, an overcoat layer of support oxide material, such as doped $ZrO_2$, and an impregnation layer including $Cu_1Mn_2O_4$ spinel or $Cu_1Co_1Mn_1O_4$ spinel.

Catalyst Material Composition, Preparation, and Configuration

FIG. 1 shows a configuration for ZPGM catalyst system 100, according to an embodiment. As shown in FIG. 1, ZPGM catalyst system 100, referred to as ZPGM catalyst system Type 1, may include at least a substrate 102, a washcoat 104, an overcoat 106, and an impregnation layer 108, where washcoat 104 may include alumina type support oxide, overcoat 106 may include doped $ZrO_2$ support oxide, and impregnation layer 108 may include $Cu_xMn_{3-x}O_4$ spinel.

In order to manufacture disclosed ZPGM catalyst system 100, the preparation of washcoat 104 may begin by milling alumina ($Al_2O_3$) to make aqueous slurry. Then, the resulting slurry may be coated as washcoat 104 on substrate 102, dried and fired at about 550° C. for about 4 hours.

The preparation of overcoat 106 may begin by milling doped $ZrO_2$ support oxide such as Praseodymium-Zirconium support oxide ($ZrO_2$—$Pr_6O_{11}$) with water to make aqueous slurry. Then, the resulting slurry may be coated as overcoat 106 on washcoat 104, dried and fired at about 550° C. for about 4 hours.

The impregnation layer 108 may be prepared by mixing the appropriate amount of Mn nitrate solution and Cu nitrate solution with water to make solution at appropriate molar ratio for $Cu_1Mn_2O_4$, according to formulation $Cu_xMn_{3-x}O_4$, in which X may take value of 0.05 to 1.5. Subsequently, Cu—Mn solution may be impregnated to overcoat 106, then fired (calcined) at a temperature within a range of about 550° C. to about 800° C., preferably at about 700° C. for about 4 to 6 hours.

Figure 2:
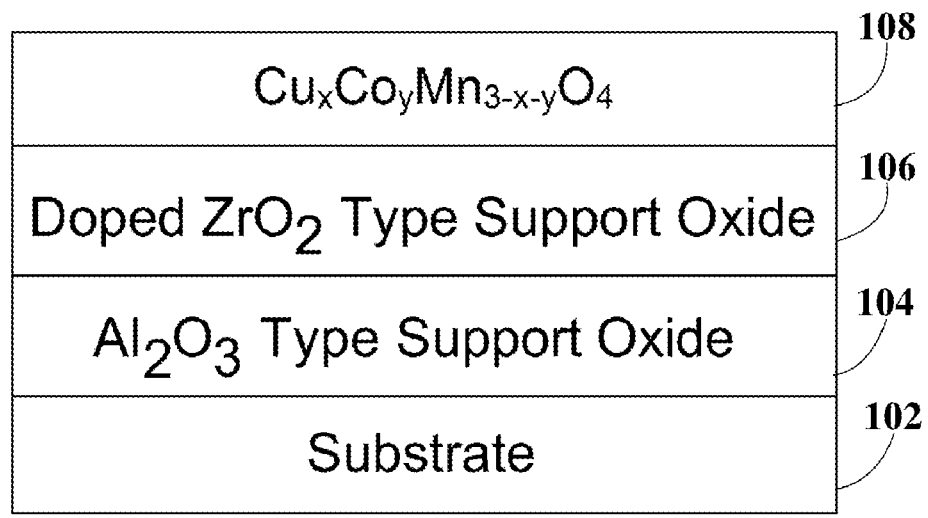
FIG. 2 shows configuration for ZPGM catalyst system Type 2, which includes an alumina-based washcoat on substrate, an overcoat with doped $ZrO_2$, and an impregnation layer including $Cu_1Co_1Mn_1O_4$ spinel, according to an embodiment.

FIG. 2 shows a configuration for ZPGM catalyst system 200, according to an embodiment. As shown in FIG. 2, ZPGM catalyst system 200, referred to as ZPGM catalyst system Type 2, may include at least a substrate 102, a washcoat 104, an overcoat 106, and an impregnation layer 108, where washcoat 104 may include alumina type support oxide, overcoat 106 may include doped $ZrO_2$ support oxide, and impregnation layer 108 may include $Cu_xCo_yMn_{3-x-y}O_4$ spinel.

In order to manufacture disclosed ZPGM catalyst system 200, the preparation of washcoat 104 may begin by milling alumina ($Al_2O_3$) to make aqueous slurry. Then, the resulting slurry may be coated as washcoat 104 on substrate 102, dried and fired at about 550° C. for about 4 hours.

The preparation of overcoat 106 may begin by milling doped $ZrO_2$ support oxide such as Praseodymium-Zirconium support oxide ($ZrO_2$—$Pr_6O_{11}$) with water to make aqueous slurry. Then, the resulting slurry may be coated as overcoat 106 on washcoat 104, dried and fired at about 550° C. for about 4 hours.

The impregnation layer 108 may be prepared by mixing the appropriate amount of Mn nitrate solution, Cu nitrate solution, and Co nitrate solution with water to make solution at appropriate molar ratio for $Cu_1Co_1Mn_1O_4$, according to formulation $Cu_xCo_yMn_{3-x-y}O_4$, in which X may take value of 0.01 to 1.0 and Y may take value of 0.01 to 1.0. Subsequently, Cu—Co—Mn solution may be impregnated to overcoat 106, then fired (calcined) at a temperature within a range of about 550° C. to about 800° C., preferably at about 700° C. for about 4 to 6 hours.

Isothermal Steady State Sweep Test Procedure

The isothermal steady state sweep test may be carried out employing a flow reactor at inlet temperature of about 450° C., and testing a gas stream at 11-point R-values from about 2.00 (rich condition) to about 0.80 (lean condition) to measure the CO, NO, and HC conversions.

The space velocity (SV) in the isothermal steady state sweep test may be adjusted at about 40,000 $h^{-1}$. The gas feed employed for the test may be a standard TWC gas composition, with variable $O_2$ concentration in order to adjust R-value from rich condition to lean condition during testing. The standard TWC gas composition may include about 8,000 ppm of CO, about 400 ppm of $C_3H_6$, about 100 ppm of $C_3H_8$, about 1,000 ppm of $NO_x$, about 2,000 ppm of $H_2$, about 10% of $CO_2$, and about 10% of $H_2O$. The quantity of $O_2$ in the gas mix may be varied to adjust Air/Fuel (A/F) ratio within the range of R-values to test the gas stream.

The following examples are intended to illustrate the scope of the disclosure. It is to be understood that other procedures known to those skilled in the art may alternatively be used.

EXAMPLES

In order to perform isothermal steady state sweep test, the following samples were prepared:

Example #1—ZPGM Catalyst System Type 1—Fuel Cut Aging Temperature of About 850° C.

Example 1 samples were prepared by aging ZPGM catalyst system Type 1 under fuel gas composition at about 850° C. for about 20 hours.

Example #2—ZPGM Catalyst System Type 1—Fuel Cut Aging Temperature of About 900° C.

Example 2 samples were prepared by aging ZPGM catalyst system Type 1 under fuel gas composition at about 900° C. for about 20 hours.

Example #3—ZPGM Catalyst System Type 2—Fuel Cut Aging Temperature of About 850° C.

Example 3 samples were prepared by aging ZPGM catalyst system Type 2 under fuel gas composition at about 850° C. for about 20 hours.

Example #4—ZPGM Catalyst System Type 2—Fuel Cut Aging Temperature of About 900° C.

Example 4 samples were prepared by aging ZPGM catalyst system Type 2 under fuel gas composition at about 900° C. for about 20 hours.

Figure 3:
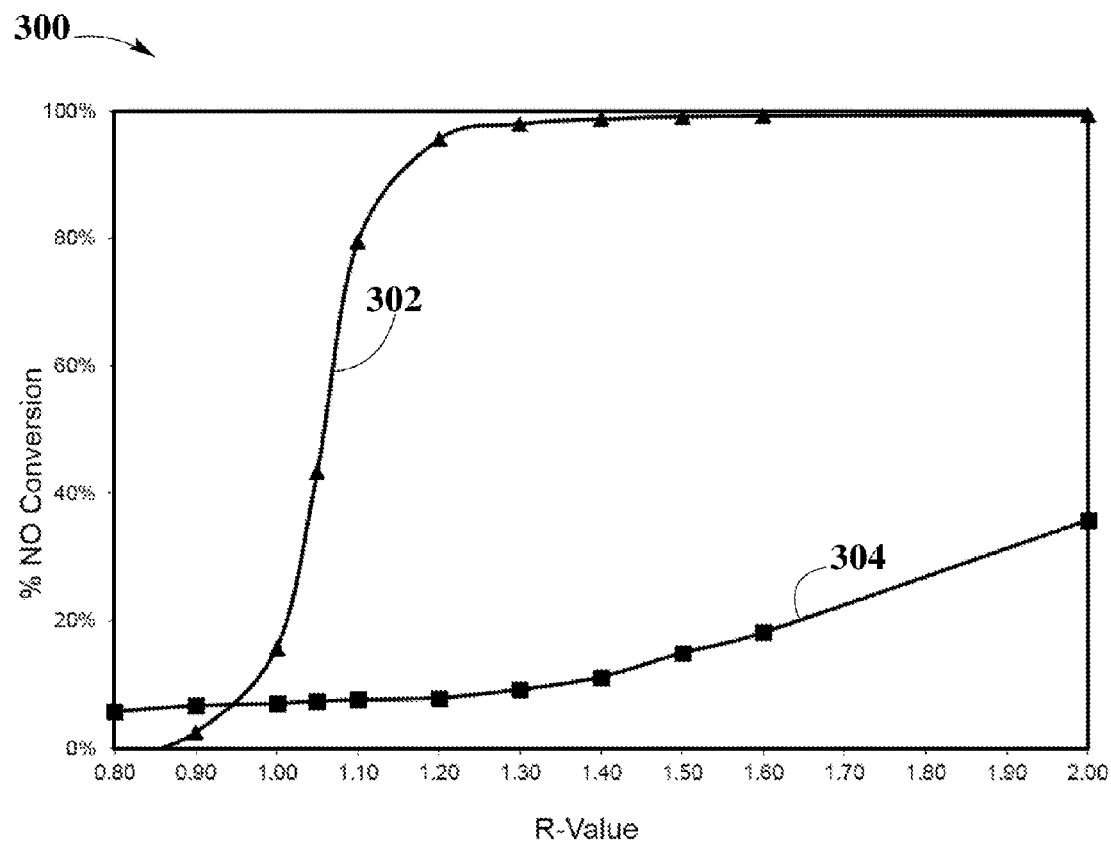
FIG. 3 shows NO conversion of ZPGM catalyst system Type 1, which were aged under fuel cut gas composition at 850° C. during about 20 hours and also at 900° C. during about 20 hours, under isothermal steady state sweep test from R-value of about 2.0 (rich condition) to about 0.80 (lean condition), at inlet temperature of about 450° C. and SV of about 40,000 $h^{-1}$, according to an embodiment.

FIG. 3 shows catalyst performance 300 and thermal stability of ZPGM catalyst type 1 which prepared according to example 1 and example 2, under isothermal steady state sweep condition, from about R-value=2.0 (rich condition) to about 0.80 (lean condition), at inlet temperature of about 450° C. and SV of about 40,000 $h^{-1}$, according to an embodiment.

In FIG. 3, NO conversion curve 302 for example 1 samples, and NO conversion curve 304 for example 2 samples show NO conversion results for ZPGM catalyst system Type 1 with different fuel cut aging temperatures.

As may be observed in FIG. 3, results from isothermal steady state sweep test for example 1 samples, fuel cut aged at 850° C. for about 20 hours, reveal a significant high activity. NO conversion significantly decreased when aging temperature increased to 900° C., as may be observed in NO conversion curve 304 for example 2 samples. Example 1 samples exhibit higher level of NOx conversion compared to example 2 samples. For example, at an R-value of 1.05 (approximately stoichiometric condition), and at an R-value of 1.2 (rich condition), example 1 samples exhibit NOx conversion of about 43.2% and 95.6%, respectively; while example 2 samples exhibit NO conversion of about 7.4% and 7.9%, respectively. By considering CO conversion, the NO/CO cross over R-value, where NO and CO conversions are equal, for example 1 samples, takes place at the specific R-value of 1.2. Moreover, there was no NO/CO cross over observed for example 2 samples.

Result of isothermal steady state sweep test show that ZPGM catalyst system Type 1 with Cu—Mn spinel as ZPGM composition, does not show thermal stability, as shown by significant decrease in NO conversion by increasing the aging temperature from 850° C. to 900° C. under fuel cut aging. This result shows ZPGM catalyst system Type 1 may shows great performance for under floor application of TWC, in which the desired aging temperature is around 850° C., however, does not show high thermal stability for catalyst position closer to engine.

Figure 4:
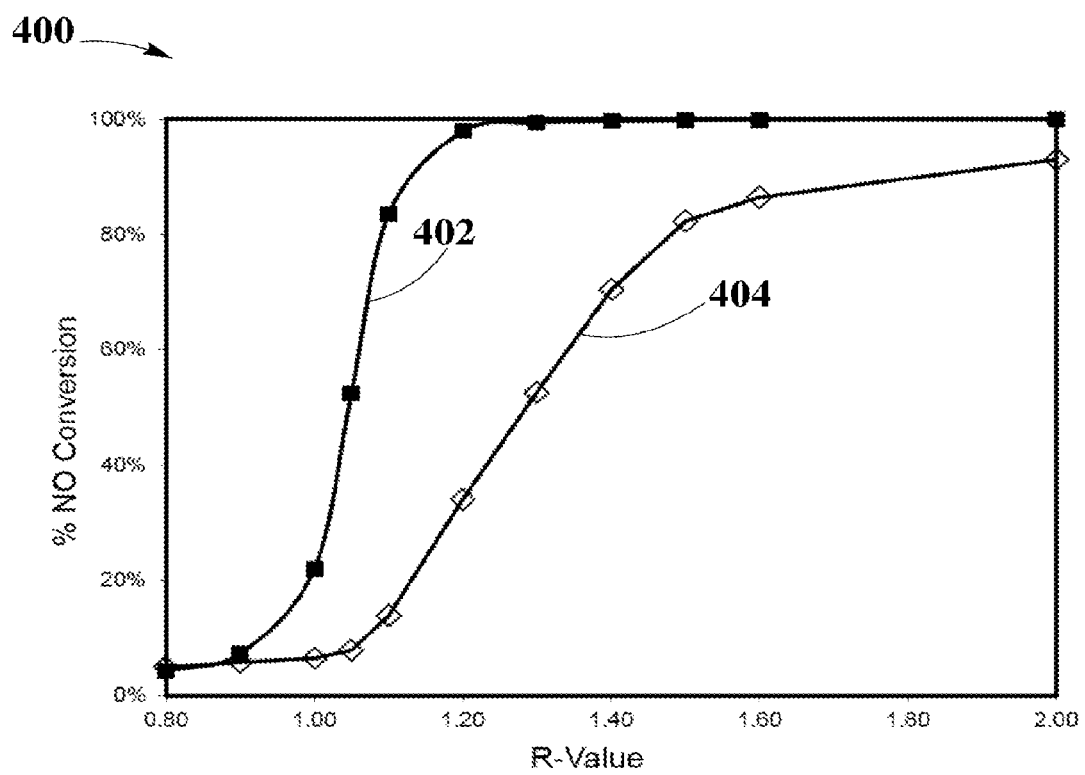
FIG. 4 shows NO conversion of ZPGM catalyst system Type 2, which were aged under fuel cut gas composition at 850° C. during about 20 hours and also at 900° C. during about 20 hours, under isothermal steady state sweep test from R-value of about 2.0 (rich condition) to about 0.80 (lean condition), at inlet temperature of about 450° C. and SV of about 40,000 h$^{-1}$, according to an embodiment.

FIG. 4 shows catalyst performance 400 and thermal stability of ZPGM catalyst system Type 2, which prepared according to example 3 and example 4, under isothermal steady state sweep condition, from about R-value of about 2.0 (rich condition) to about 0.80 (lean condition), at inlet temperature of about 450° C. and SV of about 40,000 $h^{-1}$, according to an embodiment.

In FIG. 4, NO conversion curve 402 for example 3 samples, and NO conversion curve 404 for example 4 samples show NO conversion results for ZPGM catalyst system Type 2 with different fuel cut aging temperatures.

As may be observed in FIG. 4, results from isothermal steady state sweep test for example 3 samples, fuel cut aged at 850° C. for about 20 hours, reveal a significant high activity, especially. NO conversion decreased when aging temperature increased to 900° C., as may be observed in NO conversion curve 404 for example 4 samples. Example 3 samples exhibit higher level of NOx conversion compared to example 4 samples. For example, at an R-value of 1.05 (approximately stoichiometric condition), and at an R-value of 1.2 (rich condition), example 3 samples exhibit NOx conversion of about 52.4% and 97.9%, respectively; while example 4 samples exhibit NO conversion of about 7.8% and 34%, respectively. By considering CO conversion, the NO/CO cross over R-value, where NO and CO conversions are equal, for example 3 samples, takes place at the specific R-value of 1.24. Moreover, the NO/CO cross over R-value, for example 4 samples, takes place at the specific R-value of 1.57.

Result of isothermal steady state sweep test show that ZPGM catalyst system Type 2 with Cu—Co—Mn spinel as ZPGM composition exhibit high thermal stability as shown by high level of NOx conversion after fuel cut aging at 850° C. and retaining high level of NO conversion after fuel cut aging at 900° C. This result shows ZPGM catalyst system Type 2 may shows great performance for under floor application of TWC, in which the desired aging temperature is around 850° C., however, show better thermal stability for catalyst position closer to engine when compare to ZPGM catalyst system Type 1.

Comparison of NO conversion and NO/CO cross over R-values for ZPGM catalyst system Type 1 and for ZPGM catalyst system Type 2 after fuel cut aging at temperature of 850° C. and 900° C. shows that there is an improvement on thermal stability by using Cu—Co—Mn spinel as ZPGM composition in impregnation layer 108. Therefore, addition of Co to Cu—Mn spinel provides improvement in performance of ZPGM catalyst, as well as improvement in thermal stability of the Cu_Mn spinel.

Temperature Program Reduction Procedure

Temperature programmed reduction (TPR) may be performed using $Cu_1Mn_2O_4$, and $Cu_1Co_1Mn_1O_4$ bulk powder in order to show improved thermal stability of Cu—Co—Mn spinel composition in comparison with Cu—Mn spinel composition. For this measurement about 0.1 g catalyst powder may be filled in a sample tube which may be positioned in a temperature controlled furnace of a Micromeritics AutoChemII measurement system. A thermocouple measures the temperature of the sample material. A 1% CO/He mixture may be flown through the sample tube and the composition of the gas mixture may be measured at the exit of the sample tube while the sample material may be annealed from room temperature to 1000° C. at a heating rate of about 10° C./min. If the material experiences a reduction reaction, CO is consumed from the gas mixture which may be detected and recorded in correlation with the sample temperature.

Figure 5:
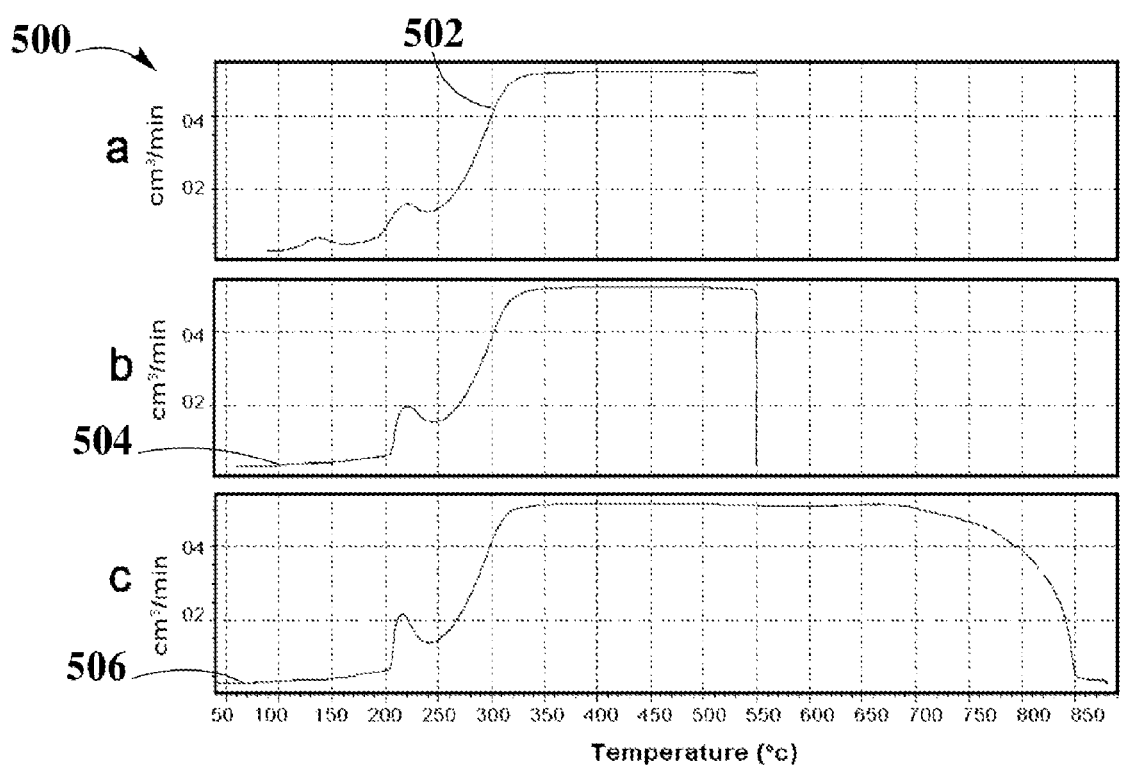
FIG. 5 depicts CO-TPR responses for $Cu_1Mn_2O_4$ bulk powders, where the samples are exposed at different temperatures to a 1% CO/He flow for a pre-defined duration, according to an embodiment.

FIG. 5 depicts CO-TPR responses 500 for $Cu_1Mn_2O_4$ bulk powders. The individual TPR measurements, shown in FIGS. 5a, b, and c are stopped at pre-defined temperatures and the samples are exposed at these temperatures to a 1% CO/He flow for a pre-defined duration. A first sample was annealed in a 1% CO/He atmosphere from room temperature up to 550° C. (10° C./min) and hold at said temperature for about 3 min (FIG. 5a), a second sample was annealed up to 550° C. (10° C./min) and hold at said temperature for about 180 min (FIG. 5b) and, a third sample was annealed up to 880° C. (10° C./min) and hold at said temperature for about 90 min (FIG. 5c). First sample, second sample, and third sample were cooled to room temperature at a rate of 90° C./min. After removing the sample material from the sample tube, XRD measurements were performed.

FIG. 5 shows that first sample (FIG. 5a), second sample (FIG. 5b), and third sample (FIG. 5c) develop a "low temperature" TPR feature between 200° C. to 220° C. In all three samples, the main reduction reaches to maximum at 320° C. developing a constant reduction rate indicated by the development of a broad plateau of the TPR signal. First sample (as shown in FIG. 5a) was removed from the reducing ambient before the reduction of the $Cu_1Mn_2O_4$ material was completed as indicated by the observation that the TPR signal 502 did not return to the baseline. Second sample (as shown in FIG. 5b) was held at 550° C. for an extended duration of about 3 hours while exposing the material to the reducing ambient. In this case the TPR signal 504 returns to the baseline suggesting that the $Cu_1Mn_2O_4$ bulk material is reduced and no additional oxygen is released from the catalyst material. The TPR signal 506 of third sample (as shown in FIG. 5c) returned to the baseline before the material was exposed to the reducing ambient for an extended duration at 880° C. indicating that the reduction of the $Cu_1Mn_2O_4$ material is completed before reaching 880° C.

In order to determine spinel phase stability during reduction process in $Cu_1Mn_2O_4$ spinel, XRD measurements of first sample, second sample, and third sample tested in CO-TPR measurement were performed.

The XRD patterns are measured on a Rigaku® powder diffractometer (MiniFlex™) using Cu Ka radiation in the 2-theta range of 15-80° with a step size of 0.02° and a dwell time of 1 second. The tube voltage and current were set at 40 kV and 30 mA, respectively. The resulting diffraction patterns are analyzed using the International Centre for Diffraction Data (ICDD) database and crystallite sizes may be calculated by means of the Scherrer equation as known in the art.

Figure 6:
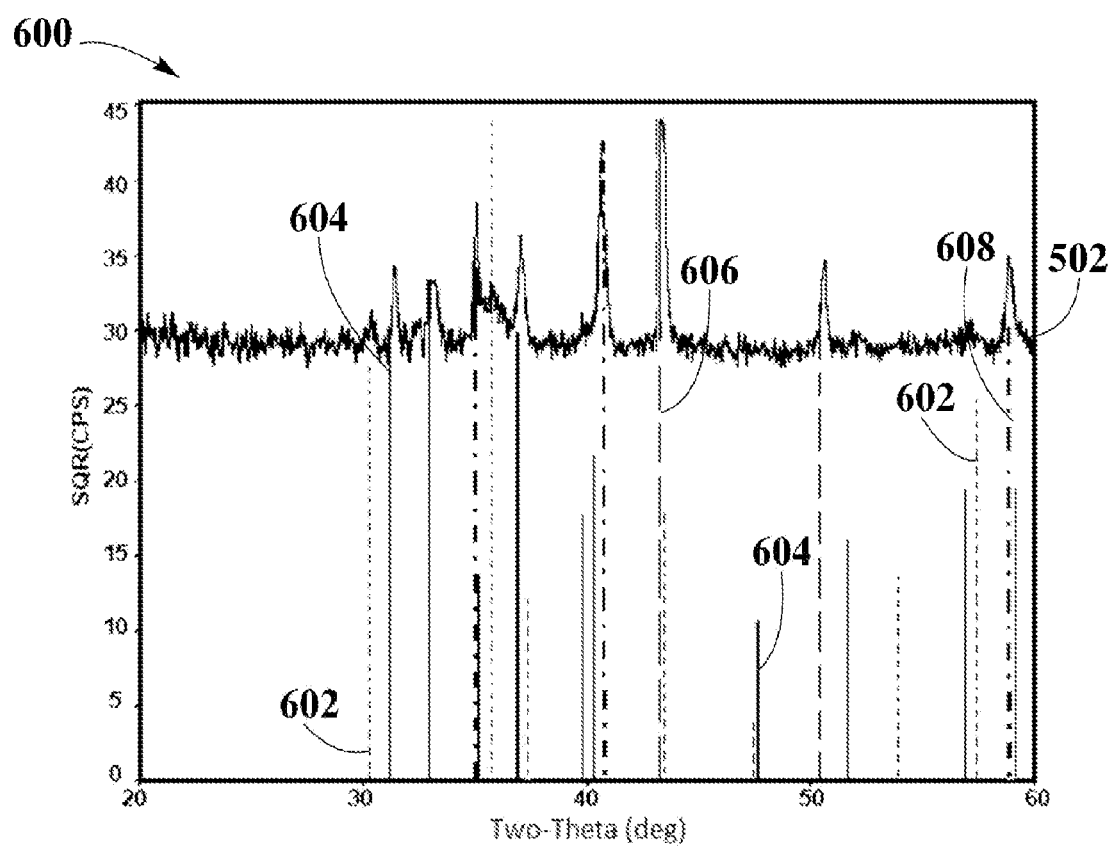
FIG. 6 depicts XRD measurement for $Cu_1Mn_2O_4$ bulk powder after the CO-TPR experiment, annealed up to 550° C. for about 3 min, according to an embodiment.

FIG. 6 depicts XRD measurement 600 for first sample (as shown in FIG. 5a), after the TPR experiment (annealed up to 550° C. for about 3 min). As shown in FIG. 6 $Cu_1Mn_2O_4$ spinel, $CuMnO_2$ oxide, metallic Cu, and MnO phases may be identified, as shown respectively by dashed lines 602, solid lines 604, long dashed lines 606, and dashed dotted lines 608. Therefore, confirming the formation of Cu shown by long dashed lines 606, and MnO shown by dashed dotted lines 608. FIG. 6 indicates that during the reduction process the $Cu_1Mn_2O_4$ spinel material, which may be employed to form ZPGM catalyst system Type 1, releases oxygen that leads formation of $CuMnO_2$ as an intermediate reaction product.

Figure 7:
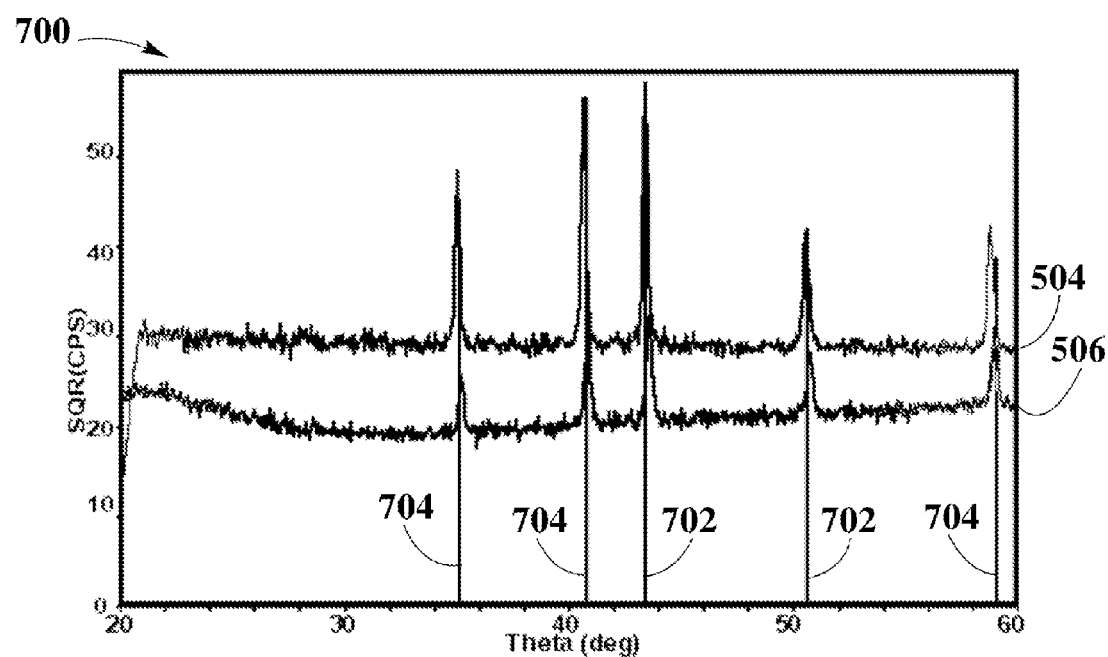
FIG. 7 depicts XRD measurements for $Cu_1Mn_2O_4$ bulk powder after the CO-TPR experiment, annealed up to 550° C. for about 180 min, and 880° C. for about 90 min, according to an embodiment.

FIG. 7 depicts XRD measurements 700 for second sample (as shown in FIG. 5b), after the TPR experiment (annealed up to 550° C. for about 180 min), and third sample (as shown in FIG. 5c), after the TPR experiment (annealed up to 880° C. for about 90 min). FIG. 7 shows $Cu_1Mn_2O_4$ is reduced to Cu, shown by solid lines 702, and MnO, shown by solid lines 704, identifying both Cu and MnO as final reduction products.

The appearance of $Cu_1Mn_2O_4$ spinel between intermediate and final reaction products suggests that the $Cu_1Mn_2O_4$ spinel is stable being exposed to the reducing ambient until the reduction process is completed. The on-going reduction process decreases the amount of spinel in the catalyst powder until no more oxygen is released which is indicated by the return of the TPR signal to the baseline as the endpoint of said $Cu_1Mn_2O_4$ spinel reduction. The endpoint of reduction for $Cu_1Mn_2O_4$ is determined either by temperature (860° C.) or by the reduction duration at a temperature above the temperature required to initiate a constant oxygen release of the $Cu_1Mn_2O_4$ spinel bulk material (>320° C.). Therefore, the endpoint temperature of reduction is used as a measure to determine the thermal stability of catalyst materials while being exposed to a reducing ambient. This result is consistent with thermal stability of ZPGM catalyst system Type 1 as shown in FIG. 3, indicating Cu—Mn spinel composition is stable after aging at 850° C. and does not show any stability when temperature of aging increased to 900° C.

Figure 8:
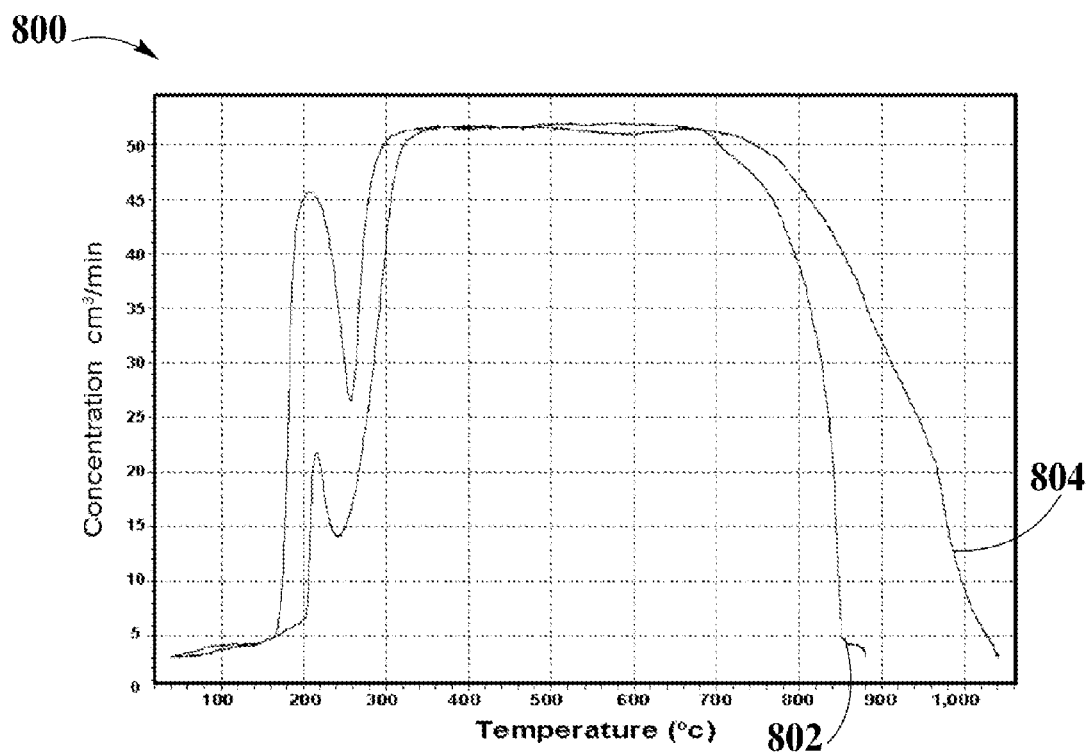
FIG. 8 shows CO-TPR responses for $Cu_1Mn_2O4$ bulk powder and $Cu_1Co_1Mn_1O_4$ bulk powder, where the samples are exposed to a 1% CO/He flow for a pre-defined temperature and duration, according to an embodiment.

FIG. 8 shows CO-TPR responses 800 for $Cu_1Mn_2O_4$ bulk powder (curve 802) that may be employed to form ZPGM catalyst system Type 1, and $Cu_1Co_1Mn_1O_4$ bulk powder (curve 804) that may be employed to form ZPGM catalyst system Type 2 (concentration curve 802). The measurement suggests that the reduction of $Cu_1Co_1Mn_1O_4$ starts at approx. 160° C. while reduction of $Cu_1Mn_2O_4$ starts at approximately 210° C. Both materials develop a "low temperature" peak with a peak maximum between 200° C. to 220° C. This feature is most likely associated with surface oxygen states which are reduced at low temperatures. The main reduction peak reaches its maximum for $Cu_1Co_1Mn_1O_4$ at about 300° C. and for $Cu_1Mn_2O_4$ at about 320° C. The peak maximum evolves into a plateau which can be understood under the assumption that all CO available in the reducing atmosphere is consumed for the reduction of catalyst bulk material. The reduction end temperature of each material was derived from the downward slope of the peak and the intersection with the baseline: $Cu_1Mn_2O_4$ shows a reduction end point at approximately 860° C. while the reduction of $Cu_1Co_1Mn_1O_4$ is completed at approximately 1040° C. At this point $Cu_1Mn_2O_4$ is most likely reduced to Cu(0) and MnO and, $Cu_1Co_1Mn_1O_4$ to Cu(0), Co(0) and Mn(II)O. The significant difference in reduction end temperature between both materials suggests that beyond a temperature of 860° C. and up to 1040° C. $Cu_1Co_1Mn_1O_4$ spinel is still releasing oxygen while $Cu_1Mn_2O_4$ is entirely reduced. Therefore, results from TPR show that $Cu_1Co_1Mn_1O_4$ spinel exhibit superior stability at high temperatures in a reducing atmosphere compared to $Cu_1Mn_2O_4$ spinel material.

Results from isothermal steady state sweep test of ZPGM catalyst system of Cu—Mn spinel and Cu—Co—Mn spinel composition at different fuel cut aging temperatures, shows significant improvement of Cu—Mn spinel as ZPGM composition for under floor position of TWC by adding Co as third element. The new composition with Cu—Co—Mn spinel structure shows significant thermal stability at high aging temperature which can be considered for catalyst position closer to engine. The temperature program reduction (TPR), and x-ray diffraction analyses (XRD) also confirmed higher thermal stability of Cu—Co—Mn spinel in comparison with Cu—Mn spinel, showing Cu—Co—Mn exhibit superior stability up to high temperatures as 1040° C. The thermal stability at temperature range of 1000° C. can be considered for three way catalyst with close couple position.

The invention claimed is:

1. A zero platinum group metal (ZPGM) catalyst system comprising:
 a substrate,
 a washcoat layer overlying the substrate,
 an overcoat layer overlying the washcoat layer, said overcoat layer consisting of $ZrO_2$—$Pr_6O_{11}$, and
 an impregnation layer deposited on a surface of the overcoat layer;
 wherein the impregnation layer comprises a spinel according to the formula $Cu_xMn_{3-x}O_4$ or $Cu_xCo_yMn_{3-x-y}O_4$, wherein X and Y are each independently 0.01 to 1.0, wherein the catalyst system has been aged at about 850° C.

2. The ZPGM catalyst system of claim 1, wherein the substrate is ceramic.

3. The ZPGM catalyst system of claim 1, wherein the impregnation layer comprises $CuMn_2O_4$ spinel.

4. The ZPGM catalyst system of claim 1, wherein the impregnation layer comprises $CuCoMnO_4$ spinel.

5. The ZPGM catalyst system of claim 4, wherein the spinel is stable up to about 1040° C.

6. The ZPGM catalyst system of claim 1, wherein the washcoat layer is an alumina-based washcoat on substrate.

7. The ZPGM catalyst system of claim 1, wherein the spinel is aged under fuel cut gas conditions.

8. The ZPGM catalyst system of claim 1, wherein nitrogen oxide (NOx) conversion is about 52% to about 98% when having an R-value of 1.2 under an isothermal steady state sweep condition.

9. A method of producing an aged zero platinum group metal (ZPGM) catalyst system comprising aging the catalyst system of claim 1 at a temperature of about 850° C.

10. The method of claim 9, wherein the aging lasts about 20 hours.

11. The method of claim 9, wherein the impregnation layer comprises $CuMn_2O_4$ spinel.

12. The method of claim 9, wherein the impregnation layer comprises $CuCoMnO_4$ spinel.

13. The method of claim 12, wherein the aged ZPGM catalyst system converts nitrogen oxide (NOx) at about 52% to about 98% when having an R-value of 1.2 under an isothermal steady state sweep condition.

* * * * *